United States Patent
Vezain et al.

(10) Patent No.: US 9,388,886 B2
(45) Date of Patent: Jul. 12, 2016

(54) ANGULAR POSITIONING DEVICE WITH THREE DEAD CENTRES

(71) Applicant: THALES, Neuilly-sur-Seine (FR)

(72) Inventors: Stephane Vezain, Mandelieu (FR); Yannick Baudasse, Grasse (FR); Sebastien Guionie, Frejus (FR)

(73) Assignee: Thales (FR)

( * ) Notice: Subject to any disclaimer, the term of this patent is extended or adjusted under 35 U.S.C. 154(b) by 35 days.

(21) Appl. No.: 13/971,765

(22) Filed: Aug. 20, 2013

(65) Prior Publication Data

US 2014/0060221 A1    Mar. 6, 2014

(30) Foreign Application Priority Data

Aug. 31, 2012 (FR) ...................................... 12 02338

(51) Int. Cl.
*F16H 21/40* (2006.01)
*G02B 7/00* (2006.01)
*G02B 7/182* (2006.01)

(52) U.S. Cl.
CPC ................ *F16H 21/40* (2013.01); *G02B 7/005* (2013.01); *G02B 7/1827* (2013.01); *Y10T 74/18184* (2015.01)

(58) Field of Classification Search
CPC ........ F16H 21/40; G02B 7/05; G02B 7/1827; H02K 7/00–7/116
USPC ....................... 74/42, 43, 51, 490.12, 490.14; 248/484–486, 184.1, 282.1, 284.1; 310/75 R, 80
See application file for complete search history.

(56) References Cited

U.S. PATENT DOCUMENTS

| 3,584,519 A | 6/1971 | Weber |
| 4,246,628 A | 1/1981 | Ikemizu et al. |
| 5,012,147 A * | 4/1991 | Bertram ................ B26B 19/282 30/43.92 |
| 5,309,779 A * | 5/1994 | Sarno ...................... F02B 41/04 74/44 |
| 2008/0156953 A1* | 7/2008 | Oh ......................... F16M 11/08 248/284.1 |

FOREIGN PATENT DOCUMENTS

FR    2779790 A1    12/1999
WO    92/08913 A1    5/1992

* cited by examiner

*Primary Examiner* — William Kelleher
*Assistant Examiner* — Randell J Krug
(74) *Attorney, Agent, or Firm* — Baker Hostetler LLP

(57) ABSTRACT

In the transmission of mechanical movements, a mechanical angular positioning device is provided, and applies notably to optical instruments necessary to position an element such as a mirror according to three predefined positions. The angular positioning device comprises an assembly of connecting rods and an assembly of pivot connections, the axes of which are parallel to one another. A first input connecting rod, a second output connecting rod and a third connecting rod are in pivot connection with a frame of the device. A fourth and a fifth connecting rod are each connected by two pivot connections to two other connecting rods. The input connecting rod can be rotated by a motor. The angular positioning device is configured such that the output connecting rod can adopt three distinct angular positions, for each of which two connecting rods in pivot connection with one another generate a dead center in the device.

9 Claims, 5 Drawing Sheets

ANGULAR POSITIONING DEVICE WITH THREE DEAD CENTRES

CROSS-REFERENCE TO RELATED APPLICATION

This application claims priority to foreign French patent application No. FR 1202338, filed on Aug. 31, 2012, the disclosure of which is incorporated by reference in its entirety.

FIELD OF THE INVENTION

The invention relates to the field of transmission of mechanical movements. It concerns a mechanical angular positioning device, and applies notably to optical instruments which make it necessary to position an element such as a mirror according to three predefined positions.

BACKGROUND

Many mechanical devices exist for carrying out angular positioning. For example, a simple step motor can permit angular positioning according to one of its steps. However, the conventional devices can be unsuitable for certain applications. This is the case for example when angular precisions of approximately a hundredth of a degree are necessary. Furthermore, additional difficulties are encountered when it is wished to obtain good stability and good reliability of the different angular positions. In other words, it is difficult to obtain precise positions which can be maintained for given durations, and which can be obtained once more when they have been left. Stringent requirements in terms of precision, stability and reliability apply notably in the field of optical instrumentation. By way of example, an optical instrument may need calibration of one of its sensors. This calibration can consist of orienting a mirror around an axis according to three distinct positions. A first position, known as the scene position, corresponds to the position in which the mirror reflects radiation from an area to be studied. It is said that the mirror points towards the area to be studied. Two other positions, known as calibration positions, correspond to positions in which the mirror reflects the radiation of reference sources. These reference emitters consist for example of black bodies or a sighting towards cold space. In this case, the calibration of the sensor requires positioning of the mirror in the first calibration position, then in the second calibration position, and finally in the scene position.

It will be appreciated that one of the elements which affects the behaviour of the mechanical positioning device is the actuator. In general, this is an electric motor. Different types of electric motors can be used. Mobile coil motors known as "voice coil" motors have great precision. However, they need control by means of servo-control in a closed loop, and the retention in a given position necessitates a permanent electrical supply. Piezoelectric actuators also have great precision. However, they must also be controlled by means of servo-control in a closed loop. In addition, they have a product of force to course which is relatively low. In practice it is therefore necessary to use piezoelectric actuators with large dimensions. Step motors have the advantage of being able to be controlled without a closed loop, and permit retention of a position without needing a supply. On the other hand, the angular precision is generally insufficient. One solution consists of associating a speed reducer with the step motor. The reducer makes it possible to reduce the angular displacement at the output relative to the angular displacement of the motor.

Thus, for each step of the motor, the angular displacement at the output represents a fraction of this step. The reducer can for example take the form of a device with gears. However, in order to obtain low transmission ratios, for example of approximately a hundredth, the device must comprise a large number of toothed wheels. In addition to the problems of complexity and size, a reducer of this type introduces play and resistant torque. Devices for elimination of play exist, but they introduce additional torque. Another reducer solution is based on the use of an arm which is rotated by the motor by means of two connecting rods. The arm is in pivot connection with a frame. A first connecting rod is rotated by the motor. The second connecting rod is connected to the first connecting rod by a first pivot connection, and it is connected to the arm by a second pivot connection. When the axes of these two pivot connections are on the same plane as the axis of rotation of the motor, the two connecting rods generate a dead centre, i.e. a configuration in which the movement of rotation of the arm is inverted. This inversion is accompanied by a localized decrease in the transmission ratio between the angular displacement of the arm and that of the rotor. However, a device of this type comprises only two dead centres, and it is not suitable for angular positioning according to three distinct positions.

SUMMARY OF THE INVENTION

An object of the invention is notably to provide a speed reducer which can provide three distinct angular positions with a low transmission ratio. For this purpose, the object of the invention is an angular positioning device comprising:
    a first connecting rod in pivot connection with a frame of the angular positioning device, according to a first axis;
    an actuating device which can rotate the first connecting rod according to the first axis;
    a second connecting rod in pivot connection with the first connecting rod, according to a second axis;
    a third connecting rod in pivot connection with the frame, according to a third axis;
    a fourth connecting rod in pivot connection with the frame, according to a fourth axis, and in pivot connection with the second connecting rod, according to a fifth axis;
    a fifth connecting rod in pivot connection with the third connecting rod, according to a sixth axis, and in pivot connection with the second or the fourth connecting rod, according to a seventh axis;
the first, second, third, fourth, fifth, sixth and seventh axes being parallel to one another;
the angular positioning device being configured such that the third connecting rod can adopt three distinct angular positions, for each of which two of the connecting rods in pivot connection with one another generate a dead centre in the angular positioning device.

The actuating device is for example a rotary motor comprising a stator integral with the frame of the positioning device, and a rotor integral with the first connecting rod.

At least one of the angular positions of the third connecting rod for which a dead centre is generated can correspond to coincidence of the second axis with the plane containing the first and the fifth axes.

According to a particular embodiment, the fifth connecting rod is in pivot connection with the second connecting rod. In this embodiment, at least one of the angular positions of the third connecting rod for which a dead centre is generated can correspond to coincidence of the fifth axis with the plane containing the fourth and the seventh axes.

According to another particular embodiment, the fifth connecting rod is in pivot connection with the fourth connecting rod. In this embodiment, at least one of the angular positions of the third connecting rod for which a dead centre is generated can correspond to coincidence of the seventh axis with the plane containing the fourth and the sixth axes.

According to a particular embodiment, the fifth and the seventh axes of the pivot connections are combined.

The object of the invention is also a system for calibration of an optical instrument, comprising an angular positioning device as previously described, an element of the optical instrument being able to be secured on the third connecting rod.

The invention notably has the advantage that it makes it possible to obtain both a low transmission ratio around angular positions of interest, and a greater transmission ratio outside these positions, which makes it possible to increase the speed of passage between the different positions.

BRIEF DESCRIPTION OF THE DRAWINGS

The invention will be better understood, and other advantages will become apparent from reading the following description, provided with reference to the attached drawings in which.

DETAILED DESCRIPTION

In general, the angular positioning device comprises an assembly of connecting rods and an assembly of pivot connections, the axes of which are parallel to one another. A first input connecting rod, a second output connecting rod and a third connecting rod are in pivot connection with a frame of the device. A fourth and a fifth connecting rod are each connected by two pivot connections to two other connecting rods of the device. The input connecting rod can be rotated by a motor. The angular positioning device is configured such that the output connecting rod can adopt three distinct angular positions, for each of which two connecting rods in pivot connection with one another generate a dead centre in the device.

Figure 1:
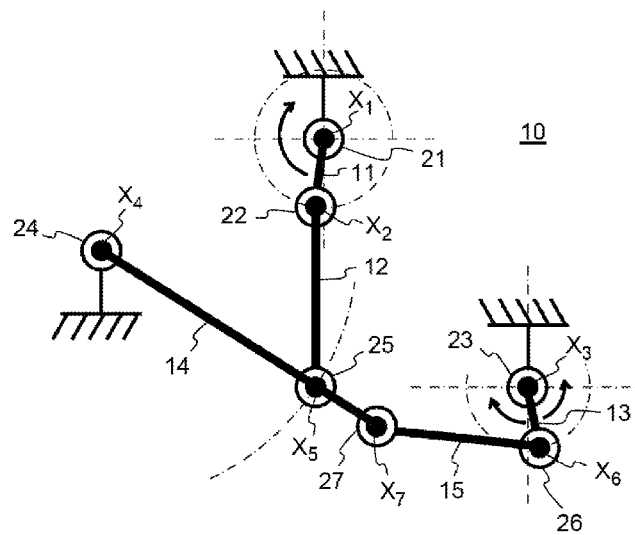
FIG. 1 represents, in the form of a kinematic diagram, a first example of an angular positioning device according to a first embodiment of the invention.

FIG. 1 represents in the form of a kinematic diagram an example of an angular positioning device according to a first embodiment. The angular positioning device 10 comprises an assembly of five connecting rods with the references 11 to 15, and an assembly of seven pivot connections with the references 21 to 27, and having for axes of rotation the axes $X_1$ to $X_7$, respectively. The first connecting rod 11 is in pivot connection with a frame of the device 10 according to the axis $X_1$. The second connecting rod 12 is in pivot connection with the first connecting rod 11 according to the axis $X_2$, parallel to the axis $X_1$. The third connecting rod 13 is in pivot connection with the frame of the device 10 according to the axis $X_3$, parallel to the axes $X_1$ and $X_2$. The fourth connecting rod 14 is in pivot connection with the frame of the device 10 according to the axis $X_4$, and in pivot connection with the second connecting rod 12 according to the axis $X_5$. The axes $X_4$ and $X_5$ are parallel to the axes $X_1$ to $X_3$. Finally, the fifth connecting rod 15 is in pivot connection with the third connecting rod 13 according to the axis $X_6$, and in pivot connection with the second connecting rod 12 according to the axis $X_7$. The axes $X_6$ and $X_7$ are parallel to the axes $X_1$ to $X_5$. In the present embodiment, the pivot connections 24, 25 and 27 are aligned on the same axis, the pivot connection 25 being situated between the pivot connections 24 and 27. In other words, the pivot connections 24, 25 and 27 are arranged on the connecting rod 14 such that their axes $X_4$, $X_5$ and $X_7$ are contained on the same plane, the axis $X_5$ being situated between the axes $X_4$ and $X_7$. However, the invention can function equally well when the axes $X_4$, $X_5$ and $X_7$ are not contained on the same plane. The device 10 also comprises a step motor, not represented, which can rotate the first connecting rod 11 relative to the frame, around the axis $X_1$. The first connecting rod 11 thus forms an input connecting rod. This is the connecting rod which imparts the movement of rotation imposed at the input by the step motor. The third connecting rod 13 forms an output connecting rod. This connecting rod must be able to adopt three distinct angular positions, with low angular displacement relative to the angular displacement of the first connecting rod 11.

Figure 2:
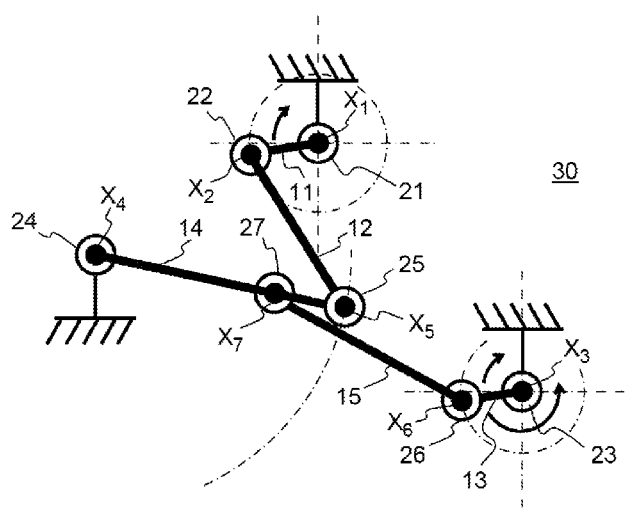
FIG. 2 represents a second example of an angular positioning device according to the first embodiment of the invention.

Again in the form of a kinematic diagram, FIG. 2 represents another example of an angular positioning device 30 according to the first embodiment. Relative to the example in FIG. 1, the axis $X_7$ of the pivot connection 27 which connects the connecting rods 14 and 15 is situated between the axes $X_4$ and $X_5$ of the pivot connections which connect the connecting rod 14 to the frame and to the connecting rod 12, respectively.

Figure 3:
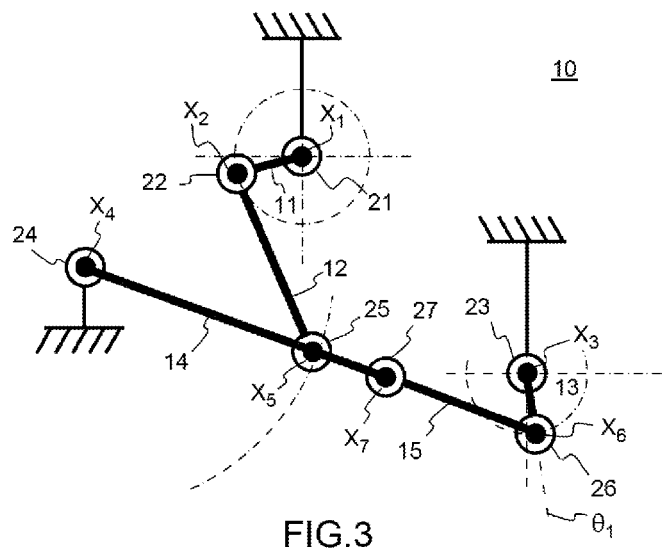
FIG. 3 represents the angular positioning device in FIG. 1 in a configuration corresponding to a first dead centre.

FIG. 3 represents the angular positioning device in FIG. 1 in a first configuration in which two connecting rods in pivot connection with one another are in a respective particular position which generates a first dead centre in the device. Dead centre means a respective particular position of two connecting rods such that the, or the other, connecting rod(s) in pivot connection with one of these connecting rods undergoes/undergo inversion of movement during the passage via this position. The movement can be a movement of rotation or translation. In this case, the connecting rods 14 and 15 are in a respective position such that the axis $X_7$ of the pivot connection 27 which connects these two connecting rods coincides with the plane which passes via the axes $X_4$ and $X_6$. This position defines a first dead centre for the connecting rod 13. During the passage via this first dead centre, the rotation of the connecting rod 13 around the axis $X_3$ changes direction. It goes from the trigonometric direction to the clockwise direction. This change of direction of the connecting rod 13 takes place for an angular position $\theta_1$ of the connecting rod 13 with angular displacement which is very low relative to the corresponding angular displacement of the connecting rod 11. Thus, during the passage via the dead centre, the transmission ratio between the angular displacement of the connecting rod 13 and the angular displacement of the connecting rod 11 is very low. More particularly, the transmission ratio decreases as the dead centre is approached, it is cancelled out during the passage via the dead centre, and then increases once more progressively while moving away from the dead centre.

Figure 4:
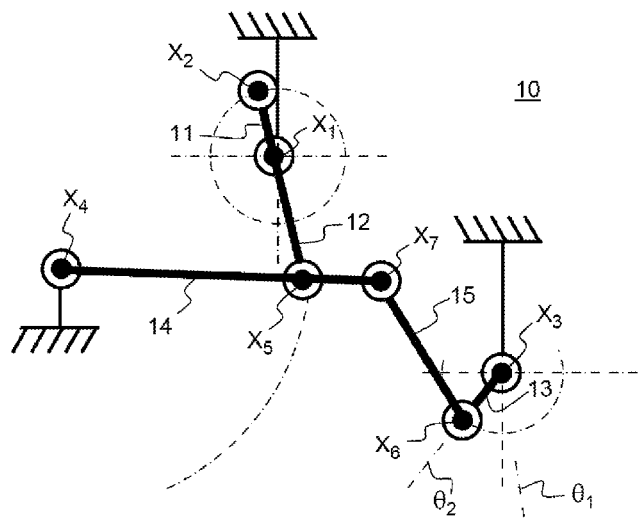
FIG. 4 represents the angular positioning device in FIG. 1 in a configuration corresponding to a second dead centre.

FIG. 4 represents the angular positioning device in FIG. 2 in a second configuration in which two other connecting rods are in a respective position which generates a second dead centre for the angular positioning device. Between the first and second configurations, the step motor has rotated the connecting rod 11 clockwise. In this configuration, the connecting rods 11 and 12 are in a respective position such that the axis $X_2$ of the pivot connection 22 which connects these two connecting rods coincides with the plane which passes via the axes $X_1$ and $X_5$, the axis $X_1$ being between the axes $X_2$ and $X_5$. This position generates a dead centre for the connecting rod 14. During the passage via this dead centre, the rotation of the connecting rod 14 around the axis $X_4$ changes direction. This change of direction of rotation gives rise to a change of the direction of rotation of the connecting rod 15 around its instantaneous centre of rotation, which in turn gives rise to a change of the direction of rotation of the connecting rod 13 around the axis $X_3$. The rotation of the connecting rod 13 thus goes from the clockwise direction to the trigonometric direction for a second angular position $\theta_2$, with angular displacement which is very low relative to the corresponding angular displacement of the connecting rod 11. In general, a dead centre generated for a given connecting rod is propagated on each of the connecting rods downstream in the transmission of movement. In this case, the dead centre of the connecting rod 14 is propagated on the connecting rod 15 then on the connecting rod 13.

Figure 5:
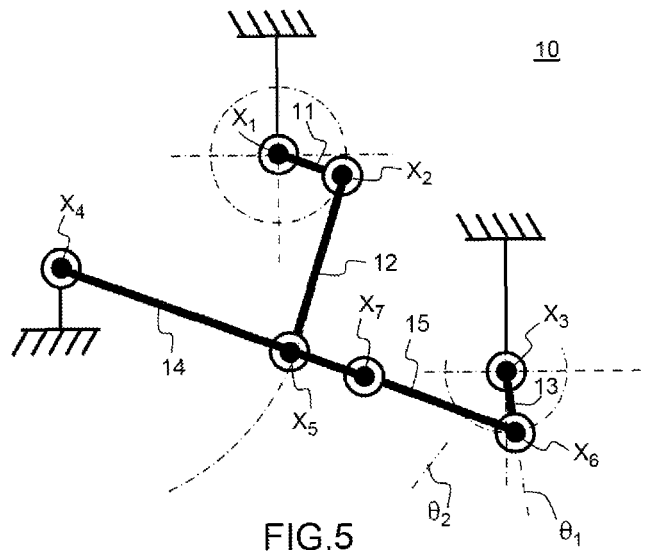
FIG. 5 represents the angular positioning device in FIG. 1 in another configuration corresponding to the first dead centre.

FIG. 5 represents the angular positioning device in FIG. 2 in a third configuration in which the two connecting rods 14 and 15 are once more in the position which generates the first dead centre. Between the second and the third configuration, the step motor has rotated the connecting rod 11 in the clockwise direction. In this configuration, the connecting rods 14 and 15 have regained the same respective position, i.e. the axis $X_7$ coincides with the plane which passes via the axes $X_4$ and $X_6$. The direction of rotation of the connecting rod 13 around the axis $X_3$ is inverted once more for the angular position $\theta_1$. It goes from the trigonometric direction to the clockwise direction in the angular position $\theta_1$.

Figure 6:
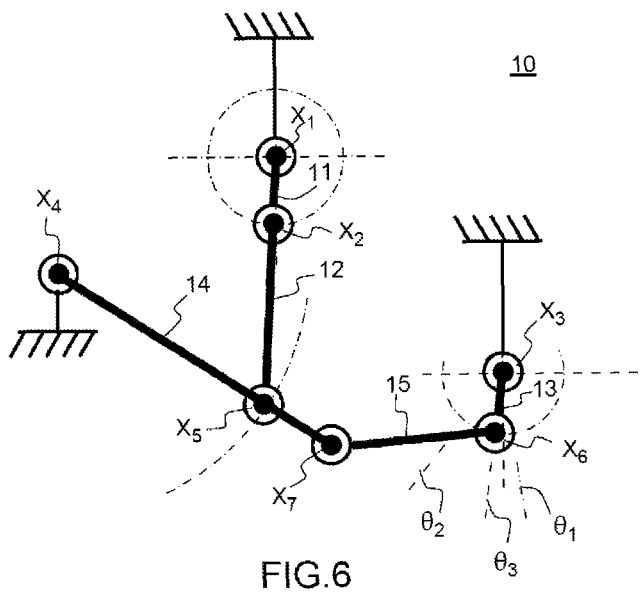
FIG. 6 represents the angular positioning device in FIG. 1 in a configuration corresponding to a third dead centre.

FIG. 6 represents the angular positioning device in FIG. 2 in a fourth configuration in which the connecting rods 11 and 12 are in a respective position which generates a third dead centre for the device. Between the third and fourth configurations, the step motor has once more rotated the connecting rod 11 in the clockwise direction. In this configuration, the connecting rods 11 and 12 are in a respective position such that the axis $X_2$ coincides with the plane which passes via the axes $X_1$ and $X_5$. However, relative to the second configuration, the axis $X_2$ is between the axes $X_1$ and $X_5$. During the passage via this third dead centre, the rotation of the connecting rod 14 around the axis $X_4$ changes direction. This change of direction of rotation gives rise to a change of the direction of rotation of the connecting rod 15 around its instantaneous centre of rotation, which in turn gives rise to a change of the direction of rotation of the connecting rod 13 around the axis $X_3$. The rotation of the connecting rod thus goes from the clockwise direction to the trigonometric direction for a third angular position $\theta_3$ of the connecting rod 13. This change of direction also takes place with very low angular displacement relative to the angular displacement of the connecting rod 11.

The step motor can once more rotate the connecting rod 11 as far as the first configuration represented in FIG. 3, and for which the connecting rod 13 adopts the angular position $\theta_1$. Thus, for a revolution turn of the connecting rod 11, the connecting rod 13 adopts in succession the angular positions $\theta_1$, $\theta_2$, $\theta_1$, $\theta_3$ and $\theta_1$, i.e. three distinct angular positions. Provided that the maximum angular clearance of the connecting rod 13, i.e. between the angular positions $\theta_1$ and $\theta_2$, represents only a portion of a complete turn, and in this case approximately 50°, it is clearly apparent that the mean transmission ratio between the angular displacement of the connecting rod 13 and that of the connecting rod 11 is lower than one. Above all, as previously indicated, the passage via the three dead centres gives rise locally to a substantial decrease in the transmission ratio.

Figure 7:
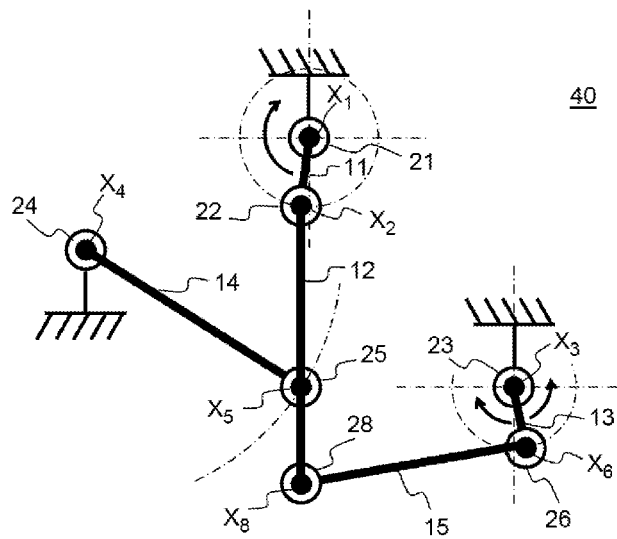
FIG. 7 represents a first example of an angular positioning device according to a second embodiment of the invention.

FIG. 7 represents in the form of a kinematic diagram a first example of an angular positioning device according to a second embodiment. The device 40 according to this second embodiment is distinguished from the devices 10 and 30 according to the first embodiment in that the connecting rod 15 is in pivot connection with the connecting rod 12, instead of with the connecting rod 14. This connection is provided by a pivot connection 28 with an axis $X_8$. The axis $X_8$ is parallel to the axes $X_1$ to $X_6$ of the pivot connections 21 to 26. In this embodiment, the pivot connections 22, 25 and 28 are arranged on the connecting rod 12 such that their axes $X_2$, $X_5$ and $X_8$ are contained on the same plane, the axis $X_5$ being situated between the axes $X_2$ and $X_8$. The invention could also function if the axis $X_5$ were not contained on the plane of the axes $X_2$ and $X_8$. In this embodiment, a dead centre can be generated for a respective particular position of the connecting rods 11 and 12, for a respective particular position of the connecting rods 12 and 14, as well as for a respective particular position of the connecting rods 12 and 15. These respective positions can be or are not obtained according to the configuration of the device, and notably the distance between the pivot connections.

Figure 8:
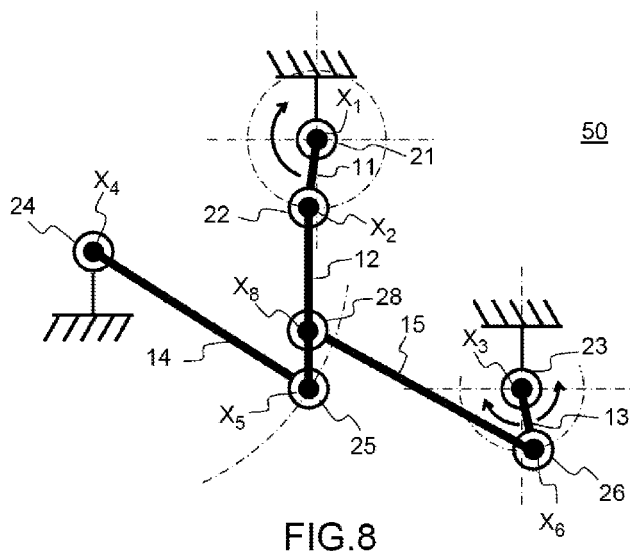
FIG. 8 represents a second example of an angular positioning device according to the second embodiment.

Again in the form of a kinematic diagram, FIG. 8 represents a second example of an angular positioning device 50 according to the second embodiment. Relative to the example in FIG. 7, the axis $X_8$ of the pivot connection 28 which connects the connecting rods 12 and 15 is situated between the axes $X_2$ and $X_5$ of the pivot connections which connect the connecting rod 12 to the connecting rod 11 and the connecting rod 14, respectively.

Figure 9:
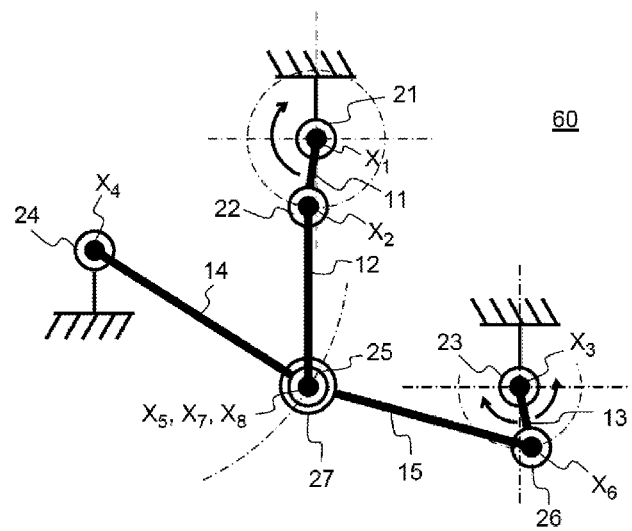
FIG. 9 represents an example of an angular positioning device according to a third embodiment.

FIG. 9 represents in the form of a kinematic diagram an example of an angular positioning device according to a third embodiment. This device 60 corresponds in reality to a combination of the first and the second embodiments. Thus, the connecting rod 15 is in pivot connection both with the connecting rod 12 and with the connecting rod 14 according to the same axis. In other words, the axes $X_5$, $X_7$ and $X_8$ are combined. This embodiment can have an advantage in terms of size.

Figure 10:
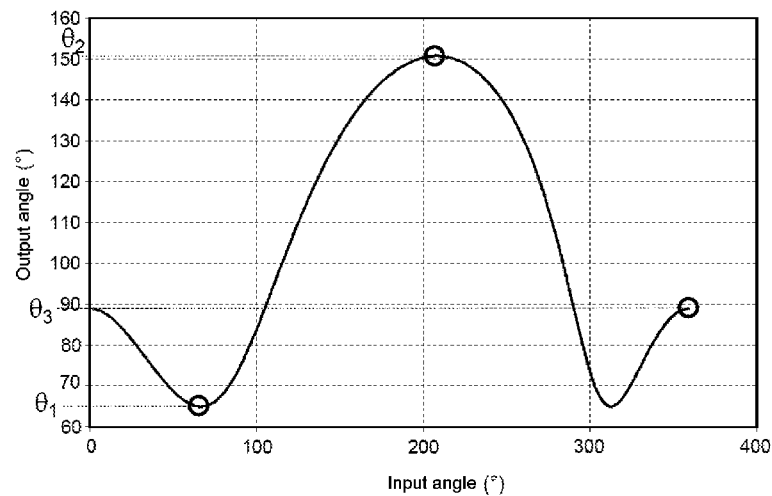
FIG. 10 illustrates in the form of a graph the development of an angular position of an output connecting rod of the angular positioning device in FIG. 9 according to an angular position of an input connecting rod of this device.

FIG. 10 illustrates in the form of a graph the development of the angular position of the output connecting rod 13 according to the angular position of the input connecting rod 11 for the angular positioning device 60 in FIG. 9. Each angular position is located relative to a reference position. The reference positions correspond in this case to one of the configurations in which two connecting rods are in a respective position which generates a dead centre. By analogy with the device 10 in FIG. 1, it is considered for example that the reference position of the connecting rod 13 is the angular position $\theta_3$. With the rotation of the connecting rod 11 around the axis $X_1$ in the clockwise direction, the connecting rod 13 rotates in the trigonometric direction towards the angular position $\theta_1$. When the connecting rods 14 and 15 generate the first dead centre, the connecting rod 13 is in the position $\theta_1$ and undergoes inversion of its direction of rotation. If the connecting rod 11 continues its movement of rotation, the connecting rod 13 then rotates in the clockwise direction as far as the position $\theta_2$. In this position, the connecting rods 11 and 12 generate the second dead centre. The connecting rod 13 undergoes once more inversion of its direction of rotation. If the connecting rod 11 continues further its movement of rotation, the connecting rod 13 thus rotates in the trigonometric direction as far as the angular position $\theta_1$. In this position, the connecting rods 14 and 15 are once more in the position of the third dead centre. The connecting rod 13 undergoes once more inversion of its direction of rotation. By continuing the movement of rotation of the connecting rod 11 as far as the reference position, the connecting rod 13 rotates in the clockwise direction as far as the angular position $\theta_3$.

In the different examples of angular positioning devices, it has been considered that the articulation of the connecting rods to one another or relative to the frame of the device was ensured by pivot connections. It will be appreciated that these articulations can be ensured by any type of connection comprising a degree of freedom in rotation around the axis concerned. In particular, each pivot connection could be replaced by a sliding pivot connection with the same axis of rotation, or by a ball joint connection. In addition, the embodiments are represented with particular configurations in terms of positioning of the axes of rotation of the different pivot connections relative to one another, and thus in terms of length of the connecting rods. It will be appreciated that the invention applies to other configurations, provided that they each generate at least three dead centres for the device.

The functioning of the angular positioning device according to the invention has been described considering that the input connecting rod 11 was always driven in the same direction of rotation in order to orient the output connecting rod 13 in the different angular positions $\theta_1$, $\theta_2$ and $\theta_3$. It will be appreciated that the connecting rod 11 can be driven in both directions of rotation.

The invention claimed is:

1. An angular positioning device, comprising:
   a first connecting rod in pivot connection with a frame of the angular positioning device, according to a first axis;
   an actuating device configured to rotate the first connecting rod a complete revolution about the first axis;
   a second connecting rod in pivot connection with the first connecting rod, according to a second axis;
   a third connecting rod in pivot connection with the frame, according to a third axis;
   a fourth connecting rod in pivot connection with the frame, according to a fourth axis, and in pivot connection with the second connecting rod, according to a fifth axis;
   a fifth connecting rod in pivot connection with the third connecting rod, according to a sixth axis, and in pivot connection with at least one of the second connecting rod and the fourth connecting rod,
   wherein the first axis is parallel to the second axis, the third axis, the fourth axis, the fifth axis, and the sixth axis,
   wherein the angular positioning device is configured such that the third connecting rod is configured to adopt three distinct angular positions,
   wherein two of the first connecting rod, the second connecting rod, the third connecting rod, the fourth connecting rod, and the fifth connecting rod that are in pivot connection with one another generate a dead center in the angular positioning device for each of the three distinct angular positions, and
   wherein an angle between the third connecting rod and the fifth connecting rod is less than 90° for at least one of the three distinct angular positions of the third connecting rod.

2. The device according to claim 1, wherein the actuating device is a rotary motor comprising a stator integral with the frame of the positioning device, and a rotor integral with the first connecting rod.

3. The device according to claim 1, wherein the second axis coincides with a plane containing the first axis and the fifth axis for at least one of the three distinct angular positions of the third connecting rod.

4. The device according to claim 1, wherein the fifth connecting rod is in pivot connection with the second connecting rod, at least one of the angular positions of the third connecting rod corresponding to coincidence of the fifth axis with the plane containing the fourth axis and a seventh axis.

5. The device according to claim 1,
   wherein the fifth connecting rod is in pivot connection with the fourth connecting rod according to a seventh axis positioned relative to the fifth axis,
   wherein the seventh axis coincides with a plane containing the fourth axis and the sixth axis for at least one of the three distinct angular positions of the third connecting rod.

6. The device according to claim 1, wherein the fifth connecting rod is in pivot connection with the second connecting rod and the fourth connecting rod according to the fifth axis.

7. A system for calibration of an optical instrument, comprising an angular positioning device according to claim 1, the third connecting rod configured to be secured to an element of an optical instrument to be calibrated.

8. The device according to claim 1,
   wherein the fifth connecting rod is in pivot connection with the fourth connecting rod according to a seventh axis positioned relative to the fifth axis,
   wherein the fifth axis coincides with a plane containing the fourth axis and the seventh axis for at least one of the three distinct angular positions of the third connecting rod.

9. The device according to claim 1,
   wherein the fifth connecting rod is in pivot connection with the second connecting rod according to a seventh axis positioned relative to the fifth axis,
   wherein the fifth axis coincides with a plane containing the second axis and the seventh axis for at least one of the three distinct angular positions of the third connecting rod.

* * * * *